(12) United States Patent
Leblanc

(10) Patent No.: US 9,447,894 B2
(45) Date of Patent: Sep. 20, 2016

(54) FLAPPER VALVE ASSEMBLY AND METHOD OF FLOWING AIR THERETHROUGH

(71) Applicant: Pratt & Whitney Canada Corp., Longueuil (CA)

(72) Inventor: Andre Leblanc, St-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 79 days.

(21) Appl. No.: 14/192,979

(22) Filed: Feb. 28, 2014

(65) Prior Publication Data

US 2015/0247420 A1 Sep. 3, 2015

(51) Int. Cl.

| F16K 15/03 | (2006.01) |
|---|---|
| F16K 15/18 | (2006.01) |
| F01D 17/14 | (2006.01) |
| F02C 9/18 | (2006.01) |
| F01D 17/10 | (2006.01) |
| F02C 3/10 | (2006.01) |

(52) U.S. Cl.
CPC ........... *F16K 15/181* (2013.01); *F01D 17/105* (2013.01); *F01D 17/145* (2013.01); *F02C 3/10* (2013.01); *F02C 9/18* (2013.01); *F16K 15/036* (2013.01); *F05D 2260/605* (2013.01); *F05D 2260/96* (2013.01)

(58) Field of Classification Search
CPC ..................... F16K 15/181; F16K 15/158036; F16K 15/038; F16K 15/036; F01D 21/14; F01D 17/145; F01D 17/105; F02C 3/10; F02C 9/18; F05D 2260/605; F05D 2260/96

USPC .................. 251/305; 137/512.1, 527, 513
See application file for complete search history.

(56) References Cited

U.S. PATENT DOCUMENTS

| 1,238,878 | A | * | 9/1917 | Bravo | B01D 61/08 |
| | | | | | 137/512.1 |
| 1,306,391 | A | * | 6/1919 | Romanoff | F16K 15/148 |
| | | | | | 137/512.15 |
| 4,445,533 | A | * | 5/1984 | DeFrees | 137/512.1 |
| 6,253,788 | B1 | * | 7/2001 | Palvolgyi | 137/512.1 |
| 8,408,864 | B2 | * | 4/2013 | Fintescu et al. | 415/28 |
| 8,439,118 | B2 | | 5/2013 | Myerley et al. | |
| 8,800,596 | B2 | * | 8/2014 | Kamp et al. | 137/512.1 |

FOREIGN PATENT DOCUMENTS

| CN | 1796841 A | 7/2006 |
| WO | WO2012099748 | 7/2012 |

* cited by examiner

*Primary Examiner* — Marina Tietjen
(74) *Attorney, Agent, or Firm* — Norton Rose Fulbright Canada LLP

(57) ABSTRACT

A valve assembly for a gas turbine engine comprising two flappers movable independently from one another between an open position and a closed position; and a fairing disposed between the two flappers. The fairing has a portion extending downstream of the two flappers. The portion is a downstream portion of a substantially streamlined body. The two flappers are movable relative to the fairing, and when in the open position, the two flappers abut the fairing and form an upstream portion of the substantially streamlined body. A method of flowing air through a valve assembly for a gas turbine engine is also presented.

15 Claims, 7 Drawing Sheets

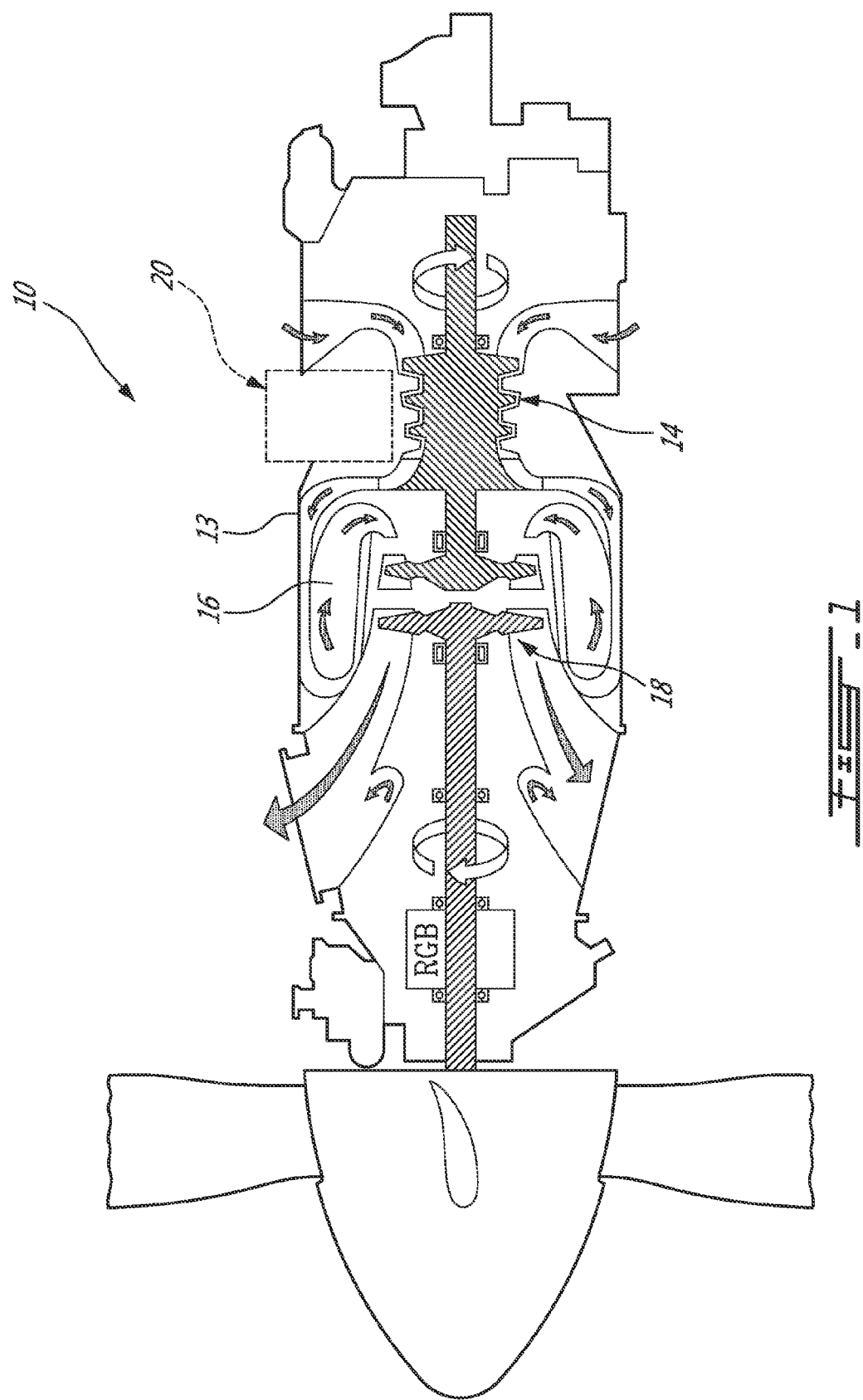

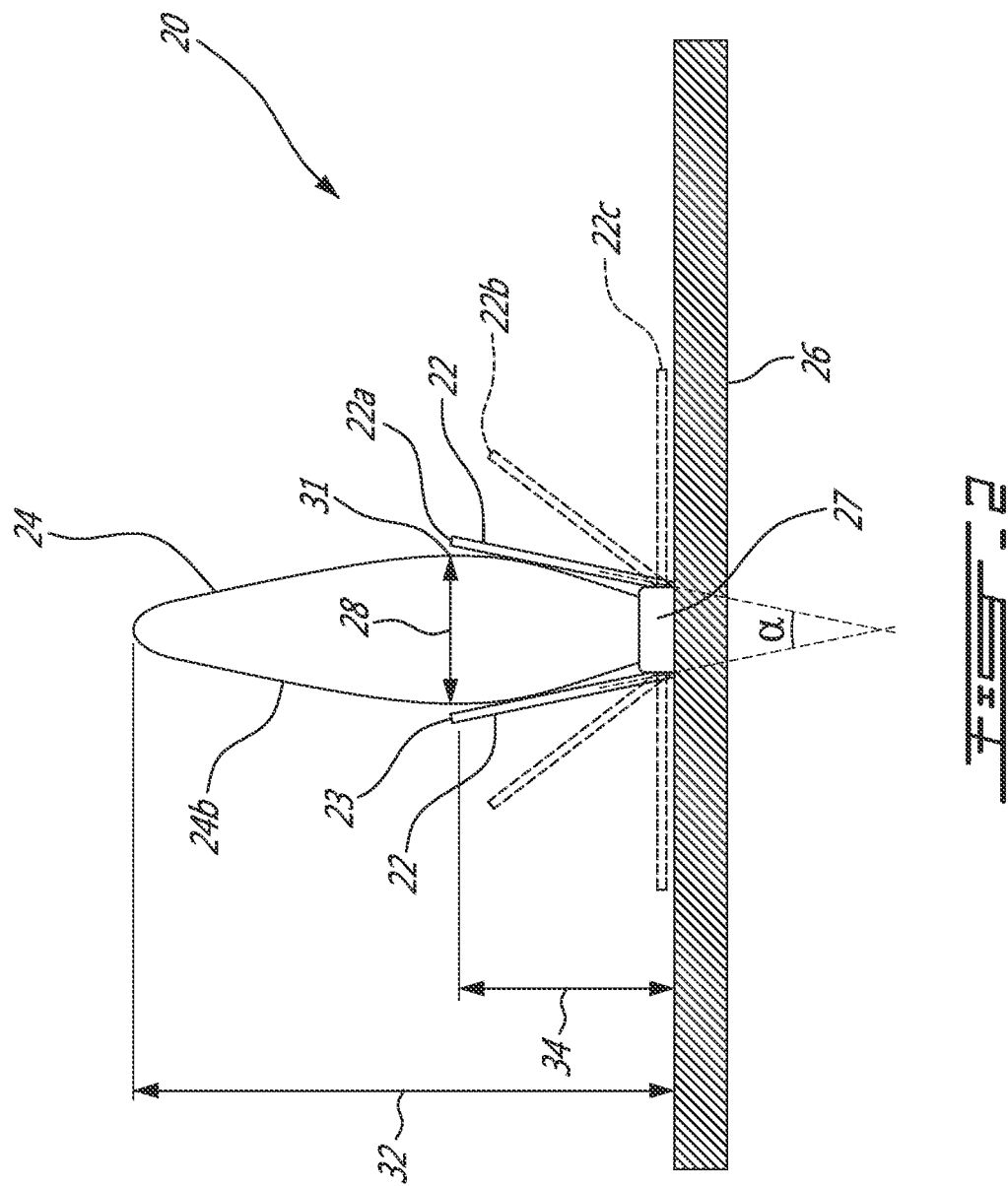

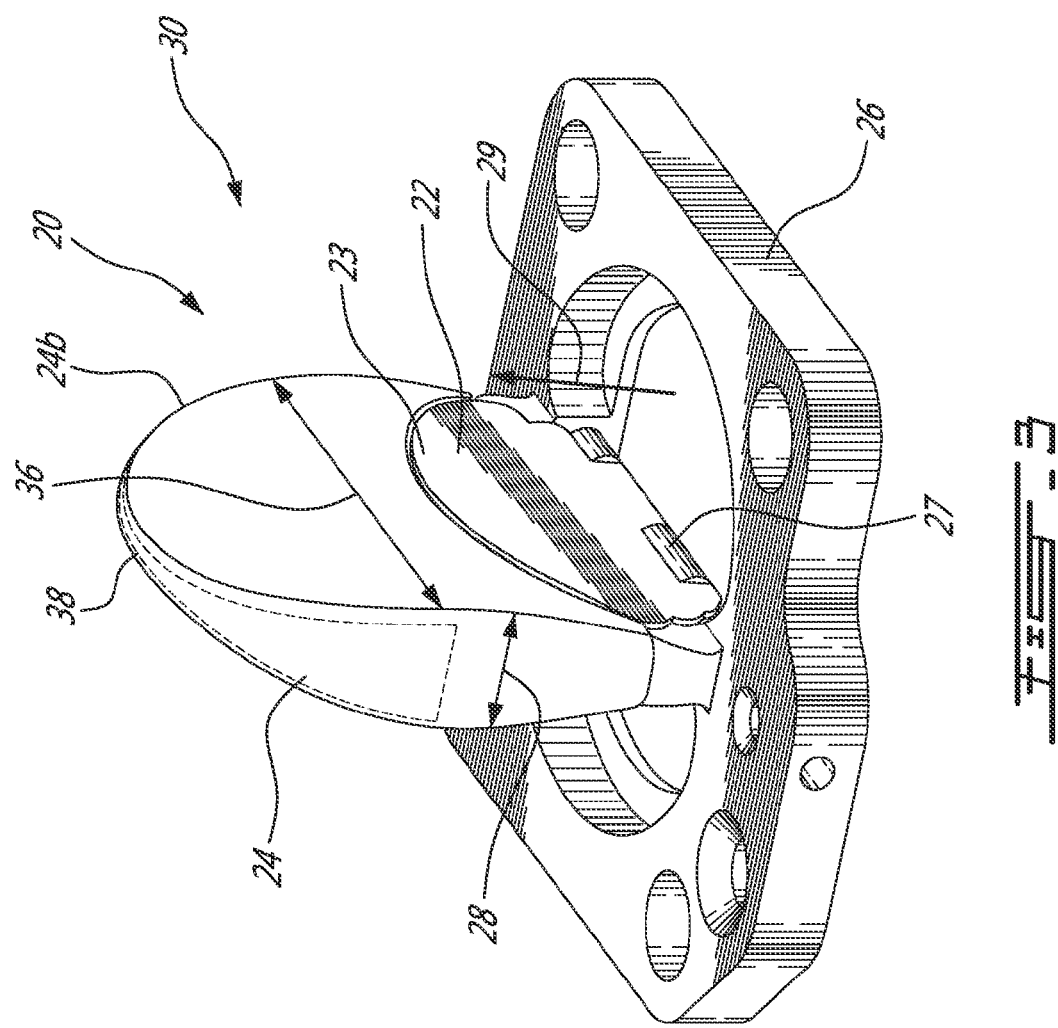

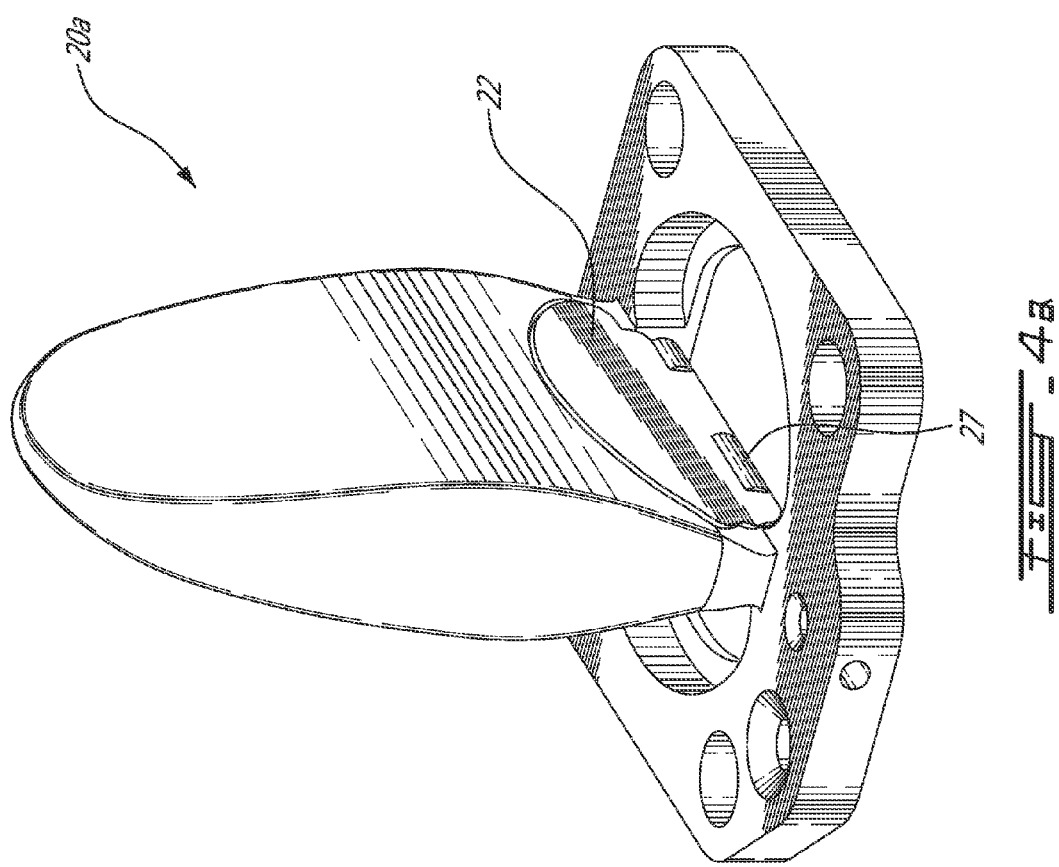

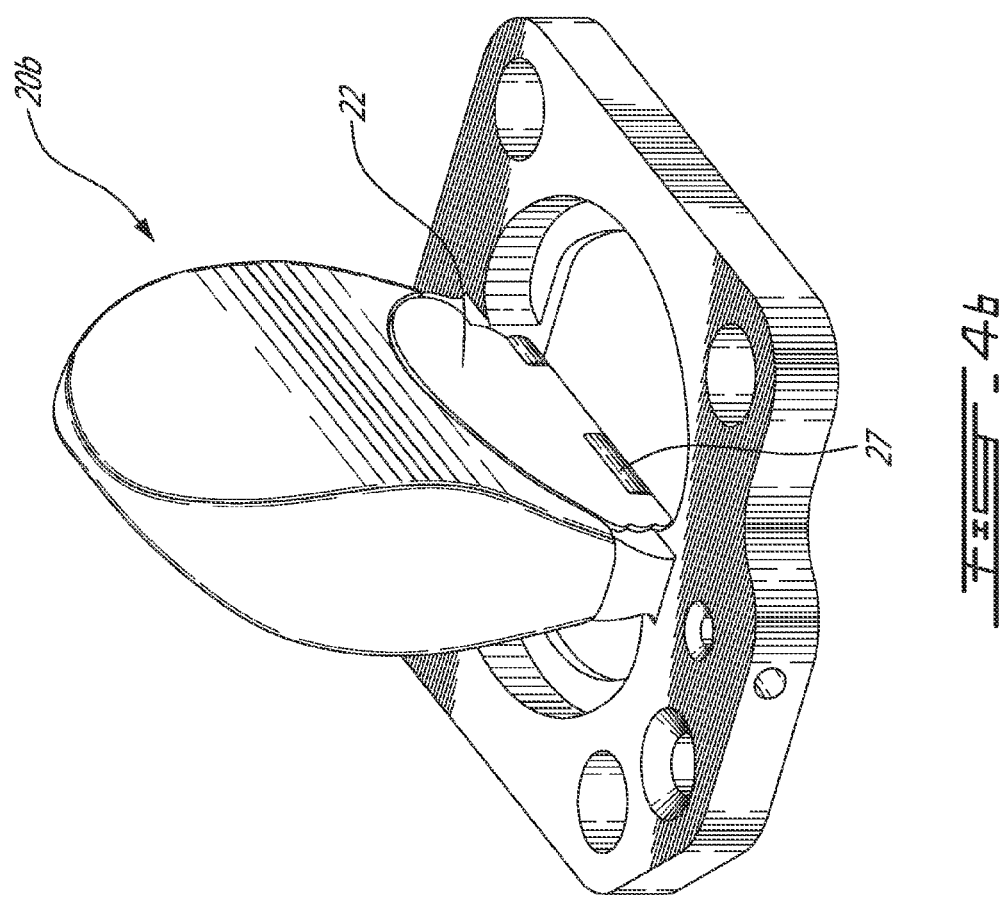

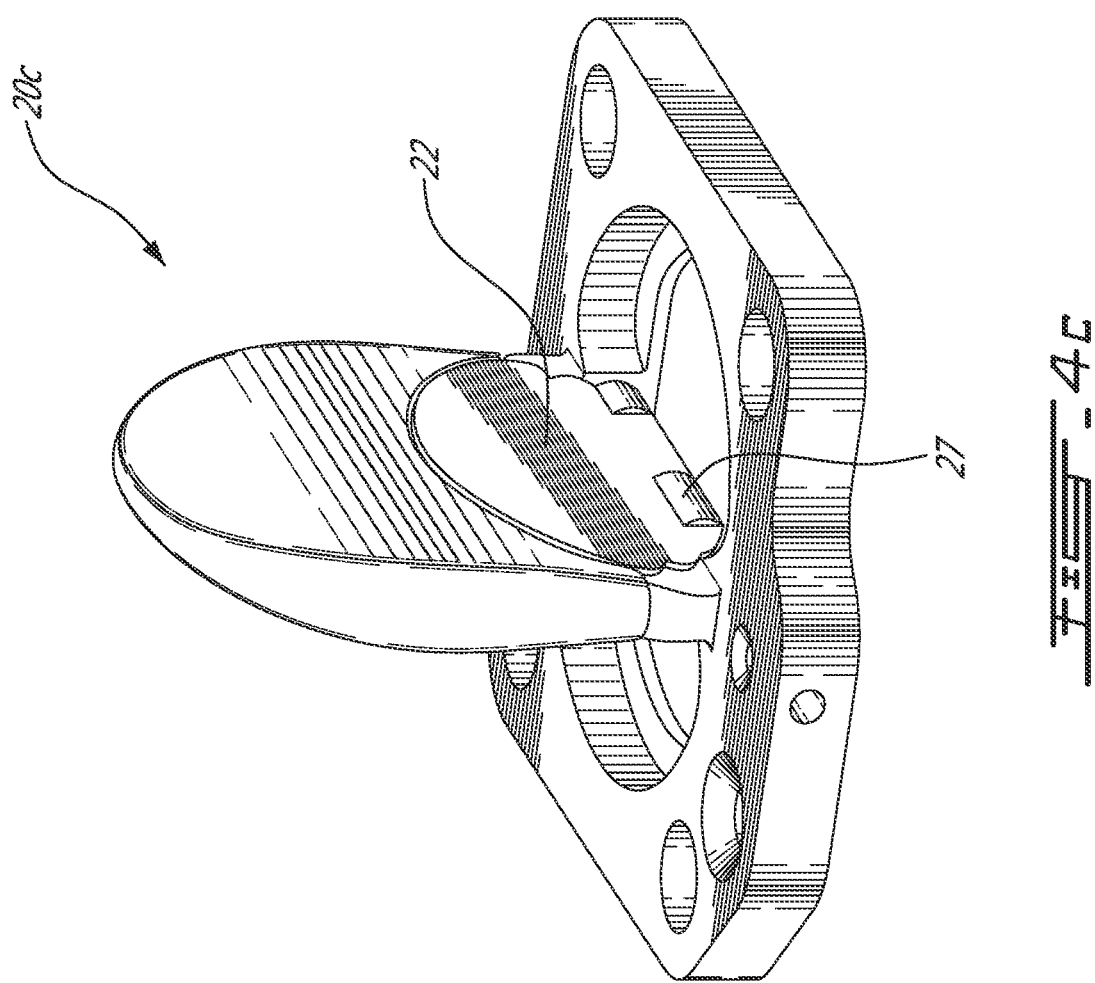

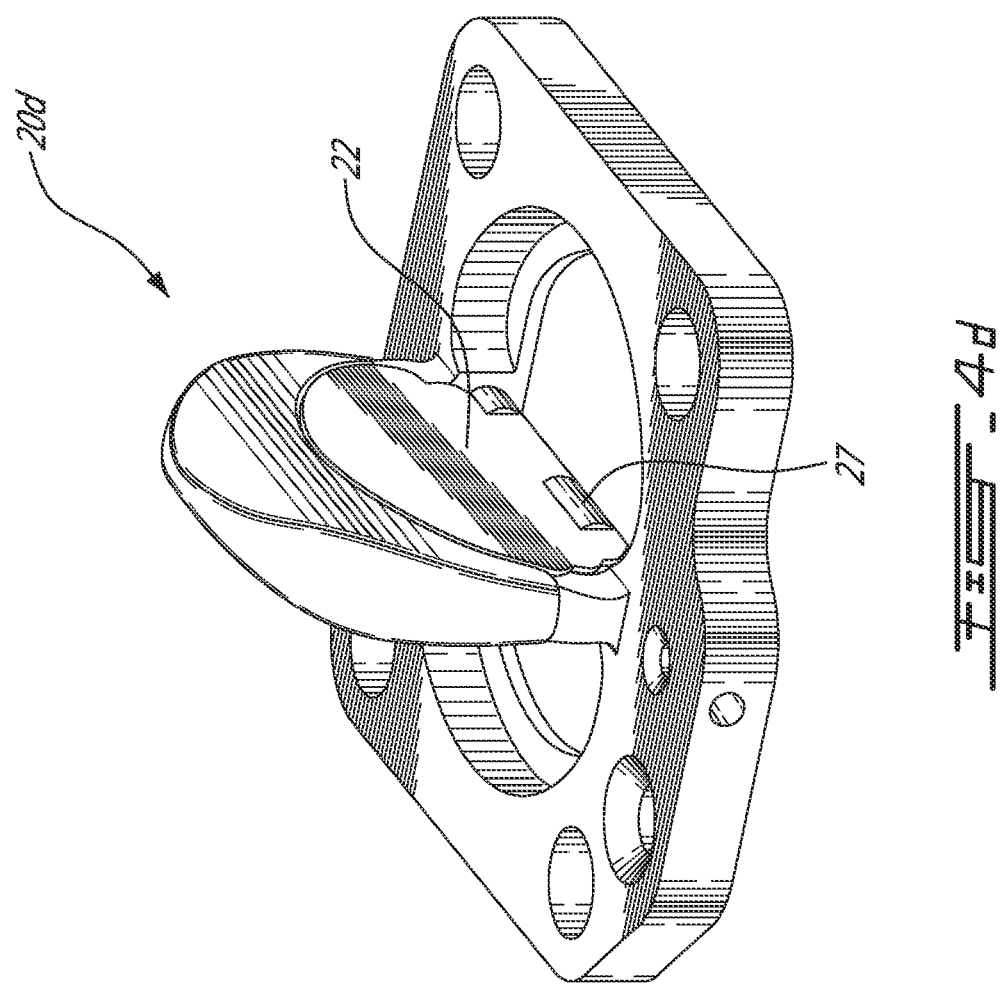

FLAPPER VALVE ASSEMBLY AND METHOD OF FLOWING AIR THERETHROUGH

TECHNICAL FIELD

The application relates generally to gas turbine engines and, more particularly, to flapper valves in gas turbine engines.

BACKGROUND OF THE ART

Flapper valves typically have two thin flappers disposed adjacent to each other back-to-back and movable between a closed position where the two flappers' tips are disposed away from each other, and an open position where the two flappers' tips are disposed close to each other. When in the open position, the flappers are subject to flickering. Flickering is a phenomenon where the flow condition includes phenomenon such as vortex shedding and turbulence around the flappers, which forces the flappers to vibrate. The constant vibration of the flappers may lead to premature cracks and failure of the flapper. In some cases a flapper's hinge attachment may break, the valve may not be able to accomplish its flow control function any longer. Portions of the flapper may even fall through the valve.

SUMMARY

In one aspect, there is provided a valve assembly for a gas turbine engine, the valve assembly comprising: two flappers movable independently from one another between an open position and a closed position; and a fairing disposed between the two flappers, the fairing having a portion extending downstream of the two flappers, the portion being a downstream portion of a substantially streamlined body, the two flappers being movable relative to the fairing, and when in the open position, the two flappers abutting the fairing and forming an upstream portion of the substantially streamlined body.

In another aspect, there is provided a method of flowing air through a valve assembly for a gas turbine engine, the method comprising, in sequence: moving flappers of the valve assembly from a closed position to an open position as a result of a flow of air exerting a force thereon; abutting the flappers onto a fairing disposed between the flappers, a portion of the fairing extending downstream of the two flappers being a downstream portion of a substantially streamlined body, and the two flappers abutting the fairing forming an upstream portion of the substantially streamlined body; and flowing the air along the substantially streamlined body.

DESCRIPTION OF THE DRAWINGS

Reference is now made to the accompanying figures in which:

FIG. 1 is a schematic cross-sectional view of a turboprop engine;

FIG. 2 is a schematic front elevation view of a valve assembly for use in an engine such as the engine of FIG. 1;

FIG. 3 is a perspective view of the valve assembly of FIG. 2; and

FIGS. 4a to 4d are perspective view of different embodiments of valve assemblies.

DETAILED DESCRIPTION

FIG. 1 illustrates a gas turbine engine 10 of a turboprop type, generally comprising in serial flow communication within a casing 13 a compressor section 14 for pressurizing the air, a combustor 16 in which the compressed air is mixed with fuel and ignited for generating an annular stream of hot combustion gases, and a turbine section 18 for extracting energy from the combustion gases. As schematically designated by reference numeral 20, at least one bleed valve is provided in the compressor section 14 to selectively bleed air from the compressor to the atmosphere.

Turning now to FIGS. 2 and 3, a valve assembly 20 includes two flappers 22 and a fairing 24 disposed between the two flappers 22. The two flappers 22 are disposed adjacent to each other in a back-to-back relationship. The two flappers 22 are pivotally connected to a base 26 by flapper hinges 27, while the fairing 24 is fixed to the base 26. The flappers 22 are movable independently from one another between an open position 22a and a closed position 22c. The flappers 22 are shown in the open position 22a in FIGS. 2 and 3. The closed position 22c and an intermediate position 22b are shown in phantom in FIG. 2. In the closed position 22c, the flappers 22 abut the base 26 thereby preventing air to flow through the valve assembly 20. In the open position 22a, the flappers 22 abut the fairing 24 allowing air to flow through the valve assembly 20 (a general direction of the flow being indicated by arrow 29 in FIG. 3). The flappers 22 are actuated by the air flowing through. The flow of air creates a force onto the flapper 22 which moves it from the closed position 22c to the open position 22a. In one embodiment, the flappers 22 abut the base 26 in the closed position 22c. In one embodiment, the flappers 22 are at 180 degrees from another in the closed position 22c. Each of the two flappers 22 is thin relative to the fairing 24 and half disk shaped. Other shapes of flappers 22 are contemplated. For example, the flappers 22 could be curved.

The fairing 24 is shaped so that when the flappers 22 are in the open position 22a, vortex shedding and turbulence are minimized compared to similar conditions without the presence of the fairing 24. Reduction of vortex shedding and turbulence may reduce flickering of the flappers 22, which in turn may increase a resistance of the flappers 22 to wear. The fairing 24 is aerodynamically designed or streamlined, i.e. it is shaped and sized to form a substantially smooth continuous flow surface when the flappers 22 are in the open position 22a. When the flappers 22 are in the open position 22a, they form with the fairing 24 a substantially streamlined body 30. As such, when in the open position 22a, flow through the valve assembly 20 is substantially smooth and non-turbulent. In some embodiments, like the one shown in FIGS. 2 and 3, the fairing 24 is also streamlined when the flappers 22 are in the closed position 22b.

The fairing 24 extends downstream of the flappers 22, i.e. a height 32 of the fairing 24 is longer than a height 34 of the flappers 22. A downstream portion 24b of the fairing 24 extending downstream of the flappers 22 when the flappers 22 are in the open position 22a constitutes a downstream portion of the streamlined body 30, while the flappers 22 in the open position 22a constitute an upstream portion of the streamlined body 30. The profile of the fairing 24 integrates the flappers 22 in the open position 22a so that there is minimal transition between the flappers 22 and the fairing 24. It one embodiment, the fairing 24 has an upstream recess shaped to accommodate the flappers 22 in the open position 22a. It is contemplated that an upstream portion of the fairing 24 could constitute an upstream portion of a streamlined body. The height 32 of the fairing 24 may also be determined in function of the local environment the valve assembly 20 is placed. For example, a shorter fairing 24 may sometimes be preferred over a longer one because the longer one would not have sufficient clearance in the local environment it is placed in. A length 36 of the fairing 24 is chosen to be at least a length of the flappers 22. When the flappers 22 are in the open position 22a, the fairing 24 thus extends beyond the flappers 22 in a direction perpendicular to the flow direction 34, which may ensure the body 30 to be streamlined along the length 36 of the fairing 24. A top 38 of the fairing 24 is rounded to ensure aerodynamicality in various flow conditions. It is contemplated that the top 38 of the fairing 24 could be flat.

In the particular embodiment shown in the figures, the fairing 24 has an airfoil profile. The airfoil profile is one example of aerodynamic profile for the fairing 24 that forms a streamlined body at least for its downstream portion. The fairing 24 has a widest portion 31 (i.e. width 28) disposed at a height from the base 26 corresponding to the height 34 of the flappers 22 when the flappers 22 are in the open position 22a. By having the widest portion 31 of the fairing 24 downstream of the flappers 22, gaps between tips 23 of the flappers 22 and the fairing 22 and/or abrupt flow transitions are minimized, which in turn decreases turbulence at the tips 23 and downstream of the flappers 22. It is contemplated that the widest portion 31 of the fairing 24 could be at a height from the base 26 larger than height 34 of the flappers 22. A curvature of the fairing 24 between about the base 26 and the widest portion 31 generally corresponds to a curvature of the flappers 22 to ensure minimal gap between the fairing 24 and the flappers 22 when in the open position 22a. In some cases, the fairing 24 can include recess(es) to accommodate the flappers 22 when in the open position 22a.

The fairing 24 also acts as a stopper to the flappers 22. Due to the presence of the fairing 24, in the open position 22a, each flapper 22 is constrained by the fairing 24 on one side and by the force created by the flow of air on the other side. By having the fairing 24 constraining the flappers 22 in an open position 22a at an angle with the flow direction 29, the flappers 22 may have less tendency to flicker and as a consequence the valve assembly 20 may be less prone to failures. The open position 22a of the flappers 22 is determined by the width 28 of the largest portion 31 of the fairing 24. The larger the width 28, the lower the open position 22a. The width 28 is determined to create an angle α between the flappers 22 so that the flappers 22 are at an angle with the flow direction 29 thereby experiencing the force created by the flow of air thereon. The angle α is determined to allow on one hand the flapper 22 to be constrained by the fairing 24 on one side and by the force created by the flow of air on the other side, and on the other hand to let flow a volume of air sufficient to relieve the inside of the casing 13. The more the flapper 22 is disposed toward the closed position 22c, the greater the force on the flapper 22 is, and in turn the less the flickering. However, the more the flapper 22 is disposed toward the closed position 22c, the less flow is allow to flow through the valve assembly 20. As a consequence, the angle α is determined to establish a compromise between these two constraints. In one embodiment, the angle α is comprised between 10 and 35 degrees. In another embodiment, the angle α is comprised between 15 and 20 degrees. In another embodiment, the angle α is comprised between 15 and 25 degrees. In yet another embodiment, the angle α is comprised between 20 and 30 degrees.

The fairing 24 may be plain or hollow, although a hollow fairing 24 could in some cases be more prone to vibration and thus breaking. The fairing 24 is made of a material compatible with the temperatures and pressures found in a local environment of the valve. In one embodiment, the fairing 24 is made of aluminum alloy.

Turning now to FIGS. 4a to 4d, various embodiments of a valve assembly 20a to 20d will be presented. The valve assemblies 20a to 20d have the same flappers 22 as the valve assembly 20 but differ by their fairings 24a to 24d.

The downstream valve fairing described above reduces and in some cases eliminates the fluctuating aerodynamic forces on the flappers caused by vortex shedding. The fairing also reduces the flow pressure loss resulting from fluctuating flow downstream of the flapper.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A valve assembly for a gas turbine engine, the valve assembly comprising:
    two flappers movable independently from one another between an open position and a closed position; and
    a fairing disposed between the two flappers, the fairing having first and second opposed sides, the fairing having a portion extending downstream of the two flappers when the flappers are in their open position, the portion being a downstream portion of a substantially streamlined body, the two flappers being movable relative to the fairing, and when in the open position, the two flappers are respectively nested into the first and second sides of the fairing and forming an upstream portion of the substantially streamlined body, the downstream portion of the streamline body extending in continuity downstream from the upstream portion formed by the flappers when in their open position, the fairing having an airfoil profile, and wherein a widest portion of the airfoil profile as defined between the first and second sides of the fairing is disposed downstream of a tip of the flappers relative to a fluid flow through the valve assembly.

2. The valve assembly as defined in claim 1, further comprising a base, the two flappers being independently hinged to the base, and the fairing being fixed to the base.

3. The valve assembly as defined in claim 1, wherein when in the open position, the two flappers form an angle comprised between 10 and 35 degrees.

4. The valve assembly as defined in claim 1, wherein a length of the fairing is at least a length of each of the flappers.

5. The valve assembly as defined in claim 1, wherein each of the two flappers is a half-disk.

6. The valve assembly as defined in claim 1, wherein a thickness of each the two flappers is smaller than a thickness of the fairing.

7. The valve assembly as defined in claim 1, wherein the fairing is made of aluminum alloy.

8. The valve assembly as defined in claim 1, wherein the widest portion of the airfoil profile is at the tip of the flappers.

9. The valve assembly as defined in claim 1, wherein when in the open position, the flappers are integrated with the fairing and form a substantially smooth continuous flow surface with the fairing, in their open position, the flappers being received in corresponding recesses defined in the first and second sides of the fairing.

10. The valve assembly as defined in claim 1, wherein in the closed position, the flappers are at 180 degrees from another.

11. The valve assembly as defined in claim 1, wherein in the closed position, an upstream portion of the fairing form the upstream portion of the streamlined body.

12. A method of flowing air through a valve assembly for a gas turbine engine, the method comprising, in sequence:
    moving two flappers of the valve assembly from a closed position to an open position as a result of a flow of air exerting a force thereon;
    nesting the flappers into corresponding recesses defined in opposed sides of a fairing having an airfoil profile and disposed between the flappers, a portion of the fairing extending downstream of the two flappers when the flappers assume their open position, the portion of the fairing being a downstream portion of a substantially streamlined body, and the two flappers abutting the fairing forming an upstream portion of the substantially streamlined body, a widest portion of the airfoil profile between the opposed sides of the fairing being disposed downstream of a tip of the flappers; and
    flowing the air along the substantially streamlined body.

13. The method as defined in claim 12, wherein moving the flappers from the closed position to the open position comprises moving the flappers from the first position where the flappers are at 180 degrees from another to the second position where the flappers form an angle smaller than 180 degrees.

14. The method as defined in claim 12, wherein moving the flappers from the closed position to the open position comprises moving the flappers from the first position to the second position where the flappers form an angle between 10 and 35 degrees from another.

15. The method as defined in claim 12, wherein moving the flappers of the valve assembly from the closed position to the open position comprises rotating the flappers from the closed position to the open position about hinges.

* * * * *